United States Patent [19]

Kawamura et al.

[11] 4,298,256
[45] Nov. 3, 1981

[54] EXPOSURE CONTROL DEVICE FOR CAMERA

[75] Inventors: Masaharu Kawamura, Kawasaki; Yoshihiro Shigeta, Tokyo; Masanori Uchidoi, Yokohama; Yoji Sugiura, Yokohama; Hiroshi Yamamoto, Yokohama, all of Japan

[73] Assignee: Canon Kabushiki Kaisha, Tokyo, Japan

[21] Appl. No.: 3,854

[22] Filed: Jan. 16, 1979

Related U.S. Application Data

[62] Division of Ser. No. 913,544, Jun. 8, 1978, abandoned.

[30] Foreign Application Priority Data

Jun. 15, 1977 [JP] Japan ............................... 52-70748

[51] Int. Cl.³ .................... G03B 7/093; G03B 15/05
[52] U.S. Cl. ............................ 354/23 D; 354/60 F; 354/149
[58] Field of Search ............... 354/23 D, 32, 33, 50, 354/51, 60 F, 139, 145, 149

[56] References Cited

U.S. PATENT DOCUMENTS 4,047,194  9/1977  Nakamura et al. ................. 354/149

*Primary Examiner*—Michael L. Gellner
*Attorney, Agent, or Firm*—Toren, McGeady & Stanger

[57] ABSTRACT

An automatic exposure control device for a camera capable of permitting flash photography includes an exposure computing portion for natural light photography wherein the computing portion generates an exposure signal corresponding to the brightness of an object and an exposure computing portion for flash photography wherein the computing portion is arranged to generate an exposure signal suitable for a flash photographing operation. An exposure control portion is responsive to one of the exposure signals generated by the natural light photographing exposure computing portion and the flash photographing exposure computing portion. A change-over device applies one of the exposure signals to the exposure control portion. An electromagnetic release device actuates the internal mechanism of the camera wherein the release device produces an electrical signal when it operates. A signal generating device generates a selection signal until the electrical signal is applied from the electromagnetic release device and generates an inhibition signal after application of the electrical signal. A discharge tube emits a flash therefrom an an accumulating portion accumulates light emitting energy for the discharge tube. A detecting device detects the accumulation of the light emitting energy and is arranged to produce a detection signal when the accumulated amount of energy reaches a predetermined value. A triggering device enables the discharge tube to emit a flash in response to the detection signal. The automatic exposure control device performs other functions relative to exposure control.

3 Claims, 6 Drawing Figures

| FIG.1A | FIG.1B |

EXPOSURE CONTROL DEVICE FOR CAMERA

This is a division of application Ser. No. 913,544, filed June 8, 1978 now abandoned.

BACKGROUND OF THE INVENTION

1. Field of the Invention

This invention relates to an automatic exposure control device for a camera and, more particularly, to an automatic exposure control device for a diaphragm preference type single-lens reflex camera performing digital control.

2. Description of Prior Art

Generally, in a diaphragm preference type single-lens reflex camera that performs digital control, analog time information which is obtained as a result of analog computation made through light measurement and setting of photographing information is converted by analog-to-digital means into digital time information; that is digitally stored and expanded to real time in response to a shutter release action of the camera to obtain digital shutter time; and a shutter is controlled thereby.

Such digitalization of a camera makes possible the automation, reduction in size and enhancement of accuracy of the camera. However, in addition to the enhancement of accuracy, the cost of the camera must be lowered.

A camera of the above mentioned digital control type has been arranged to perform digital control with a second counter provided for sequence control over various parts of the camera and a first counter provided for carrying out analog-to-digital conversion for photometric computation.

Reduction in the number of steps of these counters greatly contributes to reduction in cost. Digitalized electronic cameras, in general, use a plurality of integrated circuits (ICS). The cost of the ICs lowers as the area of chips of ICs is made smaller. Accordingly, in order to lower the cost, the number of gates must be reduced even by one. Each step of the counter requires about 10 gates or thereabout. Reduction in the number of counter steps, therefore, greatly contributes to reduction in cost.

In a camera system, it is only a self-timer that requires a long period of time with the exception of unusually long time exposure. If a counter is to be separately arranged exclusively for timer control, the second counter must have many stages including about 20 steps just for a self-timer. This has been a great obstacle to cost reduction.

SUMMARY OF THE INVENTION

It is an object of this invention to provide an exposure control device which solves the above staged shortcomings of the conventional cameras. In accordance with the invention, a first counter performing analog-to-digital conversion for a photometric purpose is connected in series with a second counter for sequence control only when it is necessary to have a long period of time. The first and second counters are normally used in a state of being separated from each other.

It is another object of this invention to provide an exposure control device wherein the second counter which is provided for sequence control admits a charge completion signal of a flash device until immediately before release of a first clamp effected by actuation of an electromagnetic release means and inhibits the charge completion signal from being accepted after the release of the first clamp.

It is a further object of the invention to provide an exposure control device which causes a check current to flow to a shutter controlling magnet for a preset period of time from commencement of a shutter release action to the release of the first clamp to check power source voltage and the magnet.

These together with other objects, advantages and features of the invention will be seen by referring to the detailed description which follows and the accompanying sheets of drawings.

DETAILED DESCRIPTION OF PREFERRED EMBODIMENTS

Figures 1, 1B:
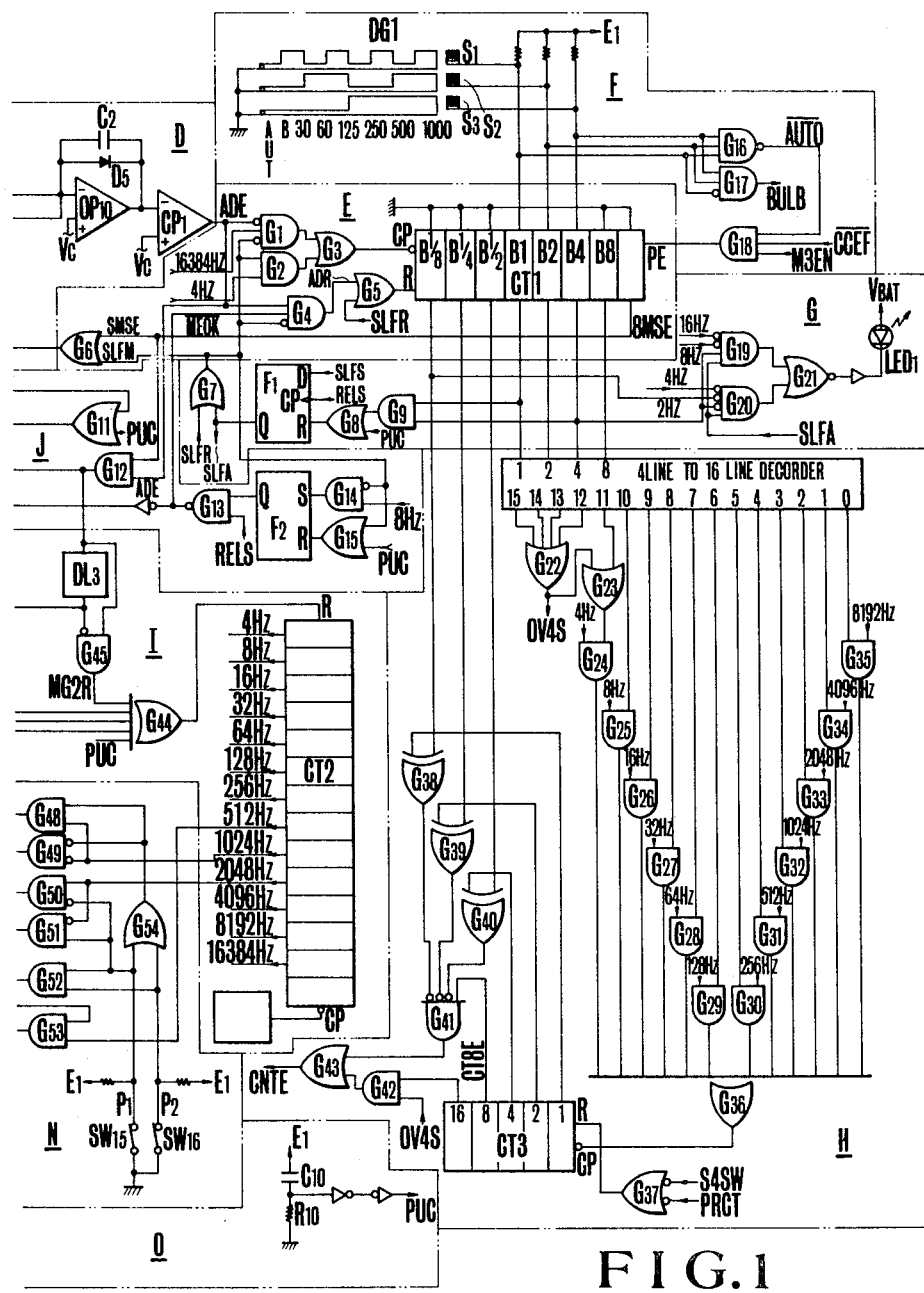
FIG. 1, 1A and 1B are an exposure control circuit diagram of a camera showing an embodiment of the invention.
Figure 1A:
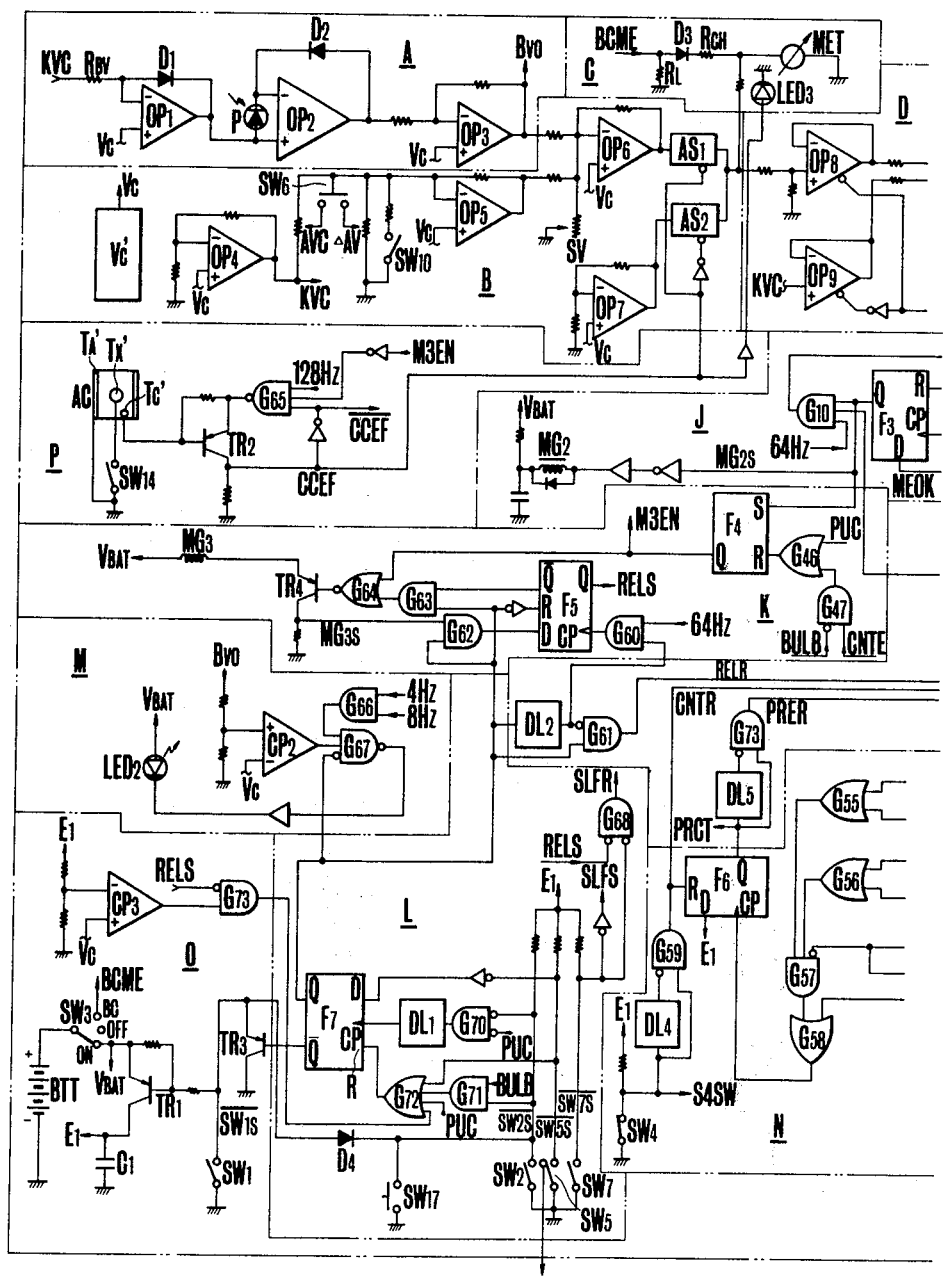

Referring to the accompanying drawings, the following description relates to a preferred embodiment of the invention. In FIG. 1 which shows an exposure control circuitry of a diaphragm preference type single-lens reflex camera, of the parts enclosed with dotted-lines, a part A shows a photometric circuit, a part B an exposure computing circuit, a part C an exposure display circuit, a part D an analog-to-digital conversion circuit, a part E a storage circuit, a part F a time mode selection circuit, a part G a self-timer display circuit, a part H a real time extension circuit, a part I a clock signal generating circuit, a part J an electromagnetic release circuit, a part K a magnet control circuit arranged to control a magnet provided for shutter time control, a part L a switch operation control circuit for controlling operations of various switches, a part M an out-of photometric range display circuit, a part N a time correction circuit, a part O a power supply circuit and a part P a flash circuit.

First, the power supply circuit O will be described.

A reference symbol BTT indicates a power source battery; and SW3 indicates a power source switch. The power source switch SW3 is shiftable between three fixed contacts ON, OFF and BC. Power supply to each part becomes possible when the power source switch SW3 is shifted to the contact ON. The power supply to each part is cut off when the switch SW3 is shifted to the contact OFF. Battery check becomes possible when the switch SW3 is shifted to the contact BC. A symbol TR1 indicates a transistor for power supply control. The transistor TR1 is connected between the contact ON and a capacitor C1 for stabilization of voltage. A symbol SW1 indicates a switch which is opened by the first stroke of a shutter release button. The transistor TR1 and another transistor TR3 are on-off controlled by opening and closing of this switch SW1. A signal BVAT is applied to each part when the switch SW3 is shifted to the contact ON. When the switch SW1 is closed, a voltage E1 develops at the capacitor C1 and is applied to each part. A symbol CP3 indicates a comparator. A divided voltage of a voltage dividing resistance on which the voltage E1 is impressed and a constant voltage VC of a constant voltage circuit VC' are applied to the comparator CP3. The output of the comparator CP3 is applied to an OR gate G72 through an inhibit AND gate G73. Symbol C10 and R10 indicate a capacitor and a resistor connected in series with each other. The voltage E1 is applied to the capacitor C10 and the resistor R10. A signal PUC is taken out from a connection point between the capacitor C10 and the resistor R10 through two inverters one after another.

The photometric circuit A includes operational amplifiers OP1, OP2 and OP3. The operational amplifier OP2 is of an MOS type having a high input impedance and has a light receiving element P1 of a TTL light measurement type connected between its two inputs to measure through a lens the brightness of an object to be photographed. Further, in a feedback line of the operational amplifier OP2, there is inserted a logarithmic suppression diode D2 to make the output of the operational amplifier OP2 into a voltage corresponding to the logarithmically suppressed object's brightness information, i.e. a brightness value Bv of APEX indication. The operational amplifier OP1 is provided for defining a non-inverted input voltage to the light measuring operational amplifier OP2.

The amplifier OP3 is arranged to have the output of the amplifier OP2 applied to its inversion input terminal and a constant voltage VC applied to its non-inversion input terminal to perform computation of them.

The computing circuit B includes a constant voltage circuit VC' which produces a constant voltage VC; an operational amplifier OP4 which receives the constant voltage VC and produces a voltage KVC which is higher than the constant voltage VC; an operational amplifier OP5 which receives the constant voltage VC at its non-inversion input terminal and receives stop information and correction information at its inversion input terminal from variable resistances AVC and ΔAV to compute them; an operational amplifier OP6 which receives the output of the operational amplifier OP5 and film sensitivity information at its inversion input terminal and receives the constant voltage VC at its non-inversion input terminal to compute them and to produce time information corresponding to the brightness of an object to be photographed; an operational amplifier OP7 which receives the constant voltage VC and produces time information for flash photography; analog switches AS1 and AS2 which are provided for applying one of the outputs of the operational amplifiers OP6 and OP7 to the next stage; a switch SW6 which turns off at the time of stopping down light measurement; and a switch SW10 which is provided for correction in case of a back-lighted object, etc. With this switch SW10 turned on the output of the operational amplifier OP6 can be corrected as much as c.

In the display circuit C, a meter MET indicates time information received through the analog switches AS1 or AS2 and also is used for battery check. A diode D3 is provided for preventing the time information from being applied to a resistor R2 of the battery check circuit when the power source switch SW3 is in the ON position.

In the analog-to-digital conversion circuit D, a symbol OP8 indicates a buffer amplifier to which time information is applied through an analog switch AS1 or AS2; OP9 indicates another buffer amplifier to which the voltage KVC is applied; and OP10 indicates an operational amplifier to which the constant voltage VC is applied through its non-inversion input terminal and the outputs of amplifiers OP8 and OP9 are applied through its inversion input terminal. This operational amplifier OP10 is provided with a capacitor in its feedback line to form a mirror integration circuit. A comparator CP1 is provided for comparison of the output of the amplifier OP10 with the constant voltage VC.

In the storage circuit E, the output of an OR gate G3 is applied to the clock input terminal CP of a counter CT1 of 8 bits. The output of an OR gate G5 is applied to the reset terminal R of the counter CT1 while the output of an AND gate G18 is arranged to be applied to a preset enable terminal PE of the counter CT1. Symbols G1, G2 and G3 indicate various kinds of gates. The output of the comparator CP1 of the analog-to-digital conversion circuit is applied to the gate G1. The gates G1 and G2 are arranged to apply pulses obtained from a counter frequency divider CT2 to the OR gate G3. The output of a gate G4 is applied to the OR gate G5. The output of an OR gate G7 is arranged to be applied to these gates G1, G2 and G4 and an OR gate G6. The output 8MSE of the eighth bit of the counter CT1 is applied to the OR gate G6. The output of the OR gate G6 is applied to the buffer amplifier OP8 and is also applied to the buffer amplifier OP9 through an inverter. The bits 1, 2, 3 and 7 of the counter CT1 are grounded.

In the time mode selection circuit F, brushes S1, S2 and S3, which are arranged to turn on and off as a shutter time dial is rotated are connected to the bits 4, 5 and 6 of the counter CT1. These bits 4, 5 and 6 of the counter CT1 are arranged to have a voltage E1 impressed thereon through their respective resistors and are connected to a NAND gate G16 and a gate G17. The output of the NAND gate G16 is applied to the AND gate G18 as $\overline{\text{AUTO}}$ signal. The output of the gate G17 is produced as BULB signal, a M3EN signal and a CCEF signal are applied to the AND gate G18.

In the self-timer display circuit G, the outputs of bits 4 and 6 of the counter CT1 are applied to an AND gate G9. The output of the AND gate G9 and the signal PUC are applied to the reset terminal R of a D type flip-flop F1 through the OR gate G8. A SLFS signal and a RELS signal are applied to the input terminals D and CP of the flip-flop F1 and a SLFA signal is taken out from the output terminal Q of the flip-flop to be applied to the OR gate G7. A SLFR signal is also applied to the OR gate G7. Symbols G19 and G20 indicate gates. The 6 bit output of the counter CT1, the SLFA signal, 16 Hz and 8 Hz pulses of the counter frequency divider CT2 are applied to the gate G19. The 1 bit output of the counter CT1, the SLFA signal and the 4 Hz and 2 Hz pulses of the counter frequency divider CT2 are applied to the gate G20. The output terminal of the gates G19 and G20 are connected through a NOR gate G21 and a buffer amplifier to a light emitting diode LED1 to which a voltage $V_{BAT}$ is applied.

In the real time extension circuit H, a decoder DE1 of 4-16 lines receives the outputs of 4, 5, 6 and 7 bits of the counter CT1 while the outputs O, 1, 2, . . . 10 of the decoder DE1 are supplied to AND gates G35, G34, . . . G25 while the 8192 Hz, 4096 Hz . . . 8 Hz pulses of the counter frequency divider CT2 are applied to other input terminals of the AND gates G35, G34 . . . G25. The outputs 12, 13, 14 and 15 of the decoder DE1 are applied through an OR gate 22 to an OR gate 23 and are taken out as OV4S signal. In additon to them, the output 11 of the decoder DE1 is applied to the OR gate G23 and the output of the OR gate G23 thus obtained is applied to an AND gate G24. Then, the 4 Hz pulse of the counter frequency divider CT2 is applied to the other input terminal of the AND gate G24. The outputs of the AND gates G24, G25 . . . G35 are applied to the clock pulse input terminal CP of a counter CT3 through an OR gate G36. The output of a NAND gate G37 to which the S4S and PRCT signals have been applied is supplied to the reset terminal R of the counter CT3. The output of the counter CT3 is applied to each of gates G38, G39, G40, G41 and G42. On the other hand, the 1, 2 and 3 bit outputs of the counter CT1 are applied to other input terminals of the gates G38, G39 and G40 which are exclusive OR gates. The outputs of these gates G38, G39 and G40 are applied to a gate G41. The output of an AND gate G42 to which the output of the gate G41 and the OV4S signal have been applied to an OR gate G43. The output of the OR gate G43 is arranged to be taken out as CNTE signal.

In the switch operation control circuit L which controls the operations of various switches, switches SW2, SW5 and SW7 are connected in parallel with each other. One side of each of these switch is grounded while the other side is arranged to have the voltage E1 impressed thereon through a resistor. The switch SW2 is arranged to be closed by a second stroke of the shutter release button. The switch SW5 is arranged to be caused by completion of winding up to shift from the illustrated position to the other contact position. A winder, which is not illustrated in the drawing, can be wound up when the switch SW5 is in the illustrated condition. The switch SW7 is closed when a self-timer is used. A switch SW17 is connected in parallel with the switch SW2 to permit remote control. These switches SW17 and SW2 are connected to the emitter of a transistor Tr3 through a diode D4. A signal in response to the opening and closing of the switch SW5 is applied through an inverter to the input terminal D of a flip-flop F7 while a signal in response to the opening and closing of the switch SW5 is applied also to the reset terminal R of the flip-flop F7 through an OR gate G72. A signal corresponding to the opening and closing of the switch SW2 is applied through a NOR gate G70 and a delay circuit DL1 to the input terminal CP of the flip-flop F7 and is also applied to the input terminal of an AND gate G71. The above mentioned PUC signal is applied to these gates G70 and G72 while the BULB signal is applied to the AND gate G71. A signal which corresponds to the opening and closing of the switch SW7 is taken out through an inverter as SLFS signal and is also applied to a NOR gate G68. The NOR gate G68 also receives the RELS signal and produces a SLFR signal as its output. The output terminal $\overline{Q}$ of the flip-flop F7 is connected to the base of the transistor Tr3 while another output terminal Q is connected to gates G61, G62, G63 and G67 and to a delay circuit DL2 respectively.

In the out-of photometric range display circuit M, a comparator CP2 compares a signal BVO with the constant voltage VC. The output of the comparator CP2 is applied to the gate G67 together with the output of the AND gate G66 to which the 4 Hz and 8 Hz pulses of the counter frequency divider CT2 have been supplied. The output terminal of the gate G67 is arranged to be connected through a buffer amplifier to the light emitting diode LED2 on which the voltage $V_{BAT}$ is impressed.

In the shutter time control magnet controlling circuit K, a symbol Mg3 indicates a shutter time control magnet; TR4 indicates a switching transistor which determines whether or not the voltage $V_{BAT}$ is impressed on the magnet Mg3; and F4 and F5 indicate flip-flops. A M3EN signal is taken out from the output terminal Q of the flip-flop F4 and is applied through the NOR gate G64 to the base of the transistor Tr4. The output of an inhibit AND gate on which the CNTE and BULB signals are impressed is supplied through the OR gate G46 to the reset terminal R of the flip-flop F4. Further, the PUC signal is applied to the OR gate G46. The reset terminal R of the flip-flop F5 is connected through an inverter to the output terminal Q of a flip-flop F7. The output of the AND gate G62 is applied to the input terminal D of the flip-flop F5 while the output of the AND gate G60 is applied to the input terminal CP of the flip-flop F5. The collector of the transistor Tr4 is connected to the input terminal of the AND gate G62 while the 64 Hz pulse of the counter frequency divider CT2 is applied to the AND gate G60. A signal from the output terminal Q of the flip-flop F5 is applied to the NOR gate G64 through the AND gate G63 while a signal from the output terminal $\overline{Q}$ of the flip-flop F5 is taken out as RELS signal.

In the electromagnetic release circuit J, an electromagnetic releasing magnet Mg2 has a diode connected in parallel therewith and is connected to a connection point between a resistor on which the voltage $V_{BAT}$ is impressed and a capacitor. Reference symbols F2 and F3 indicate flip-flops. The output of an OR gate G7 and the output of an inhibit AND gate G14 on which the 8 Hz pulse of the counter frequency divider CT2 has been impressed are applied to the input terminal S of the flip-flop F2; while the output of the OR gate G7 and the output of the OR gate G15 on which the PUB signal has been impressed are applied to the reset terminal R of the flip-flop F2. The output terminal Q of the flip-flop F2 is connected to the NAND gate which receives the RELS signal. The output of the NAND gate G13 is applied to the gate G4 and is also applied to the input terminal D of a flip-flop F3 through an inverter. The output of an AND gate G12 is applied to the input terminal CP of the flip-flop F3 while the output of an OR gate G11 is applied to the reset terminal R of the flip-flop F3. To the AND gate G12 are applied, the output of the comparator CP1, the 8 bit output of the counter CT1 and the 8MSE signal while the PUC signal is applied to the OR gate G11. The output of the output terminal Q of the flip-flop F3 is applied to an AND gate G10 and to the input terminal S of the flip-flop F4 and is also supplied through an inverter and a buffer amplifier to the magnet Mg2 which is provided for electromagnetic release. The AND gate G10 receives the 64 Hz pulse of the counter frequency divider CT2 and the output thereof is applied to the OR gate G11.

In the clock signal generating circuit I, a counter frequency divider CT2 of 14 bits generates pulses of 16384 Hz. Reference symbols DL2, DL3 and DL5 indicate delay circuits respectively, and G45, G59, G61 and G73 indicate inhibit AND gates. The output of the AND gate G12 is directly applied to the gate G45 and is also applied thereto through the delay circuit DL3. The output of the delay circuit DL3 is applied to the AND gate G10. The output of the delay circuit DL2 is applied to the gate G60 and to the gate G61. To the gate G73 are applied the output of the delay circuit DL5 and a signal from the output terminal Q of the flip-flop F6. While the signal from the output terminal Q of the flip-flop F6 is applied to the delay circuit DL5, it is also taken out as PRCT signal. The outputs of the gates G45, G59, G61 and G73 and the PUC signal are supplied to an OR gate G44. The output of the OR gate G44 is applied to the reset terminal R of the counter frequency divider CT2.

In the time correction circuit N, one end of each of shutter time correcting switches SW15 and SW16 is grounded while the voltage E1 is applied through a resistor to the other end thereof. A signal corresponding to the opening and closing of the switch SW15 is applied to the gates G50, G51, G52 and G54. A signal corresponding to the opening and closing of the switch SW16 is applied to the gates G52 and G54. The output of the OR gate G54 is applied to the gates G48 and G49 while the 1024 Hz pulse of the counter frequency divider CT2 is also applied to these gates G48 and G49. The 2048 Hz pulse of the counter frequency divider CT2 is applied to the inhibit AND gates G50 and G51. The output of the AND gate G52 and the 512 Hz pulse of the counter frequency divider CT2 are applied to an AND gate G53. The outputs of the gates C48 and G49 are applied to an OR gate G55. The outputs of the gates G50 and G51 are applied to an OR gate G56. The outputs of these gates G52, G55 and G56 are applied through an AND gate G57 to an OR gate G58. The output of the AND gate G53 is also applied to the other input terminal of this OR gate G58 and the output of the gate G58 is applied to an input terminal CP of a flip-flop F6. The voltage E1 is impressed on one side of a count switch SW4 through a resistor while the other side thereof is grounded. A signal corresponding to the opening and closing of the count switch SW4 is applied to a delay circuit DL4 and to an inhibit AND gate G59 and is also taken out as a S4SW signal. The output of the delay circuit DL4 is also applied to gate G59. The output of the gate G59 is applied to the reset terminal R of the flip-flop F6 while the voltage E1 is impressed on the input terminal D of the flip-flop F6.

In the flash circuit P, an accessory shoe AC is provided with terminals TC', TX40 and TA'. A symbol SW14 indicates a X contact which is provided between the terminals TA' and TX'; Tr2 indicates a transistor the base of which is connected to the termina TC' while the emitter of the transistor Tr2 is arranged to have the output of NAND gate G65 applied thereto. The collector of the transistor Tr2 is grounded through a resistor. A signal from the collector of the transistor Tr2 is applied through an inverter to a gate G65 and is also taken out as $\overline{CCEF}$ signal. A $\overline{M3EN}$ signal is applied through an inverter to the gate G65 while the 128 Hz pulse of the counter frequency divider CT2 is also applied to the gate G65. The signal from the collector of the transistor Tr2 is applied to an analog switch AS1 and is also applied through an inverter to an analog switch AS2. The signal is further arranged to be applied through a buffer amplifier to the light emitting diode LED3.

Figure 2:
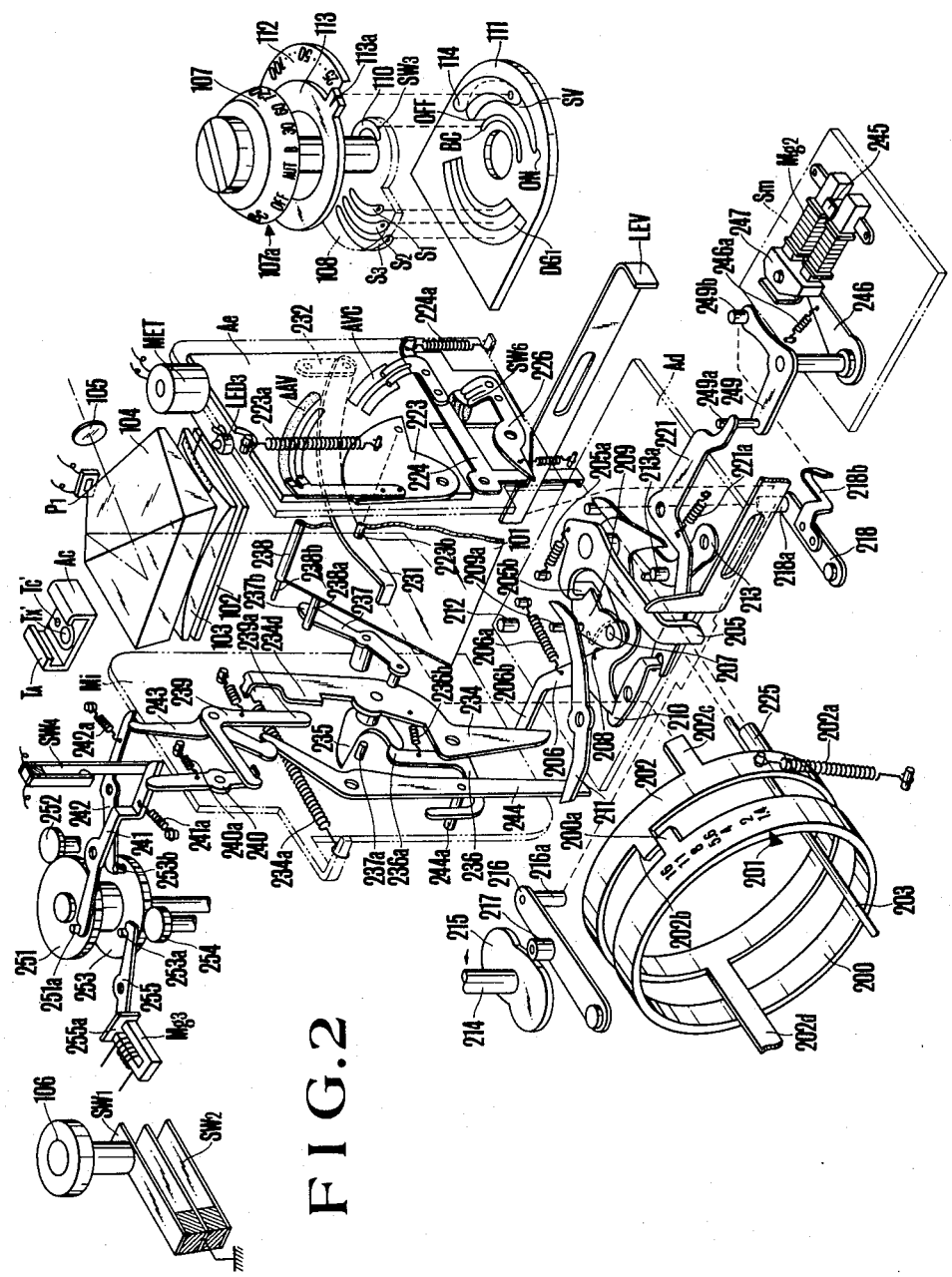
FIG. 2 is an illustration of the inner structural arrangement of the camera equipped with the circuitry shown in FIG. 1.

FIG. 2 shows the interior mechanism of a camera which is equipped with the exposure control circuit shown in FIG. 1. In FIG. 2, like reference symbols designate like parts shown in FIG. 1. A transmission light from a photograh taking lens which is not shown is sighted by a photographer via an eye-piece 105 coming through a reflecting mirror 101, a reticle 102, condenser lens 103 and pentagonal prism 104 one after another. A symbol P1 indicates a light receiving element. A part of light coming from the pentagonal prism is incident upon the light receiving element for which a silicon photo diode or the like is used. A symbol AC indicates an accessory shoe which is provided on the camera body above the pentagonal prism; TX' indicates a synchronizing contact; TC' indicates a contact for a flash control signal; and TA indicates a grounding part. A symbol MET indicates a meter which displays shutter time inside a view finder. The deflection of a pointer of the meter indicates the shutter time to be used for photographing displayed on the shutter time graduation disposed in a peripheral portion of the view finder. The light emitting diode LED3 provided for indicating a flash light photographing operation also serves to illuminate the meter. Switches SW1 and SW2 are arranged to be turned on repsectively by the first and second depression strokes of a shutter release button 106. On a time mode selection dial 107, there are engraved position markings BC for battery check, OFF for cutting off the power supply, AUT for automatic exposure, B for bulb photographing and shutter times 30, 60, . . . 1000 for manual setting. A reference numeral 107a indicates an index. On the shaft of the dial 107, there is provided a sliding plate 108 which is provided with three brushes S1, S2 and S3 and a brush 110. On a base plate 111, there are provided a conductor pattern DG1 which is arranged as shown in FIG. 1 and the contacts BC, OFF and ON of the switch SW3 which is shown in FIG. 1. When the dial 107 is rotated, the brushes S1, S2 and S3 brush the conductor pattern DG1 while the contact brush 110 brushes over the contacts BC, OFF and ON of the switch SW3. A numeral 112 indicates a film sensitivity (ASA) setting dial which is disposed coaxially with but separately from the above stated dial 107; and 113 indicates an index plate which is provided with an index 113a for adjusting thereto the film sensitivity values engraved on the dial 112. A numeral 114 indicates a brush which is interlocked with the dial 112 to brush a resistor SV disposed on the base plate 111.

A numeral 200 indicates an aperture ring which is provided with aperture values engraved thereon and also with a protrusion 200a; 201 indicates an index provided for setting an aperture value therewith; and 202 indicates an aperture preset ring which is urged by a spring 202a to rotate clockwise and which is provided with a protrusion 202b arranged to engage with the protrusion 200a of the above stated aperture ring 200. The clockwise rotation of the aperture preset ring 202 urged by the spring 202a is prevented by the protrusion 202b of the ring 202. The aperture ring 200 is imparted with a frictional force that permits rotation of the aperture ring 200 only by a manual operation. Further, on the aperture preset ring 202, there is provided an arm 202c. The ring 202 is also provided with a lever 202d attached thereto to determine the rotation of a bell crank through an aperture setting cam ring which is not shown in the drawing. The bell crank is provided for defining the rotation of an unillustrated diaphragm driving ring to determine a diaphragm aperture. A numeral 203 indicates a pin secured to the diaphragm driving ring. The end of the pin 203 engages with an automatic stop lever 205 which is urged to rotate counterclockwise by a spring 205a of an automatic stop unit Ad. This automatic stop lever 205 is provided with a downward bent 205b.

The automatic stop lever is provided with an automatic stop force accumulator lever 206 which is rotatable coaxially with the lever 205. The automatic stop force accumulator lever 206 is urged by a spring 206a to rotate clockwise. In the middle portion of one side of the lever 206, there is provided a shaft 207 which is rotatably attached to a common lever 209 through a spring 208. One end of the common lever 209 engages with the downward bent 205b of the automatic stop lever 205 and is provided with a pin 209a. The automatic stop force accumulator lever 206 is also provided with an engaging claw for retaining the pulling force of the spring 206a. An automatic stop return signal lever 211 has one end of it disposed in a position to engage the pin 209a of the common lever 209. The rotation range of the automatic stop force accumulator lever 206 is defined by a stopper pin 212. The spring 206a of the automatic stop force accumulator lever 206 is charged by a charge lever 213, which engages one end of the lever 206 at a stepped part 213a of a pin secured to the middle portion of the charge lever 213. To charge this charge lever 213 in response to a winding up operation of a wind-up lever which is not shown, there is provided a charge cam 215 which is unified with a shaft 214 interlocked with the wind-up lever; and there are also provided a charge transmission lever 216, a roller 217 and a pin 216a secured to the intermediate lever 216. An intermediate lever 218 is provided in a position opposite to the charge transmission lever 216 and is coupled to the lever 216 through a link member which is not shown. A pin 218a is secured to the intermediate lever 218 while a magnet charge plate 218b which is formed by an elastic material is secured to the middle part of the lever 218. A numeral 221 indicates a release lever which is urged to rotate counterclockwise by a spring 221a. In the stop control unit Ad, there is also provided a sector gear 223 which has a slider over a resistance ΔAV. The sector gear 223 is urged by a spring 223a to rotate counter-clockwise. The spring 223a is set to be weaker than the spring 202a which is disposed on the lens side. A transmission lever 224 is provided with a slider over a resistance AVc and is urged by a spring 224a to rotate clockwise. The transmission lever 224a is rotated against the spring 224a in response to a full opening correction pin 225 on the lens side to determine the resistance value of the resistance AVc. A switch SW6 is provided for selection between full open light measurement and stopping-down light measurement. The shifting of the selection switch SW6 is effected when a lever 226 which is provided as moving contact piece is moved by movement of an operating lever LEV. The switch SW6 is turned on for full open light measurement and is turned off for stopping-down light measurement. In other words, in the case of full open light measurement, the variable resistances AVc and ΔAV are connected to a circuit as shown in FIG. 1 and the full-open F value and a stopped down value of the lens are set. A numeral 231 indicates a signal lever. One end of the signal lever 231 engages the arm 202c of the aperture preset ring 202. The pin 223b which is secured to the sector gear 223 is arranged to have the middle part of the signal lever 231 pivotally connected thereto. The other end of the signal lever 231 is pivotally connected to a supporting lever 232. In a mirror lifting mechanism unit Mi, there is provided a mirror driving lever 234 which engages the tip portion 206b of the above stated automatic stop force accumulator lever 206. The upper end bent portion of the lever 234 is urged by a spring 234a to rotate counterclockwise. A mirror spring up lever 235 is pivotally arranged coaxially with the mirror driving lever 234 and engages with a hook portion 236a of a spring of locking claw 236 pivotally connected to the shaft 234c of the mirror driving lever 234. The spring up locking claw 236 is urged to rotate clockwise by a spring 236b. The mirror spring up lever 235 engages with a pin 237a secured to one end of an intermediate spring up lever 237. The other end of the lever 237 engages with a pin 238a secured to a mirror receiving plate 238. A numeral 238b indicates a rotating shaft of the mirror receiving plate 238. The mirror driving lever 234 is provided with a protrusion 234d, which engages with one end 239a of a front diaphragm locking lever 239. The other end is in engagement with an uprising portion of the front diaphragm release lever 240 being urged to rotate clockwise by a spring 240a. The upper end of the front diaphragm release lever 240 engages with front diaphragm clamping lever 241. The front diaphragm clamping lever is urged by a spring 241a to rotate clockwise while the tip of the lever 241 is in engagement with a pin 251a secured to a front diaphragm gear 251. A symbol SW4 indicates a count switch which is normally turned on and is arranged to be turned off by the rotation of the front diaphragm clamping lever 241. The front diaphragm gear 251 engages with a front diaphragm pinion 252 of a front diaphragm drum which is not shown. A numeral 253 indicates a rear diaphragm gear which is provided coaxially with but separately from the front diaphragm gear 251. This rear diaphragm gear 253 is in engagement with a rear diaphragm pinion 254 of a rear diaphragm drum which is not shown. Pins 253a and 253b are secured to the rear diaphragm gear 253. A numeral 255 indicates an attraction lever which is arranged to be rotated by the pin 253a and is arranged to be attracted to a shutter controlling magnet Mg3 by its iron piece 255a. A numeral 242 indicates a rear diaphragm signal lever which is rotated by the pin 252b and is urged by a spring 242a to rotate counterclockwise. The other end of the rear diaphragm signal lever 242 engages with one end of a lever 243 while the other end of the lever 243 is in engagement with an upper end of a mirror return signal lever 244. A pin 244a which is secured to the middle part of the mirror return signal lever 244 engages with the end portion of the spring up locking claw. Further, the lower end portion of the mirror return signal lever 244 engages also with the end portion of an automatic stop return signal lever 211 of the above mentioned unit Ad. In a camera release unit Sm, there is provided an electromagnetic releasing magnet Mg2, which includes a permanent magnet 245. A numeral 246 indicates an armature holding lever which holds an armature 247. The armature holding lever 246 is urged to rotate counterclockwise by a spring 246a which is set to be stronger than the spring 221f of the above stated release lever 221 and to be weaker than the attracting force of the permanent magnet 245. A start lever 249 is coaxially arranged with the armature holding lever 246. The start lever 249 is provided with pins 249a and 249b. The pin 249a engages the release lever 221 while the pin 249b is arranged to be pushed by a charge plate 218b.

Figure 3:
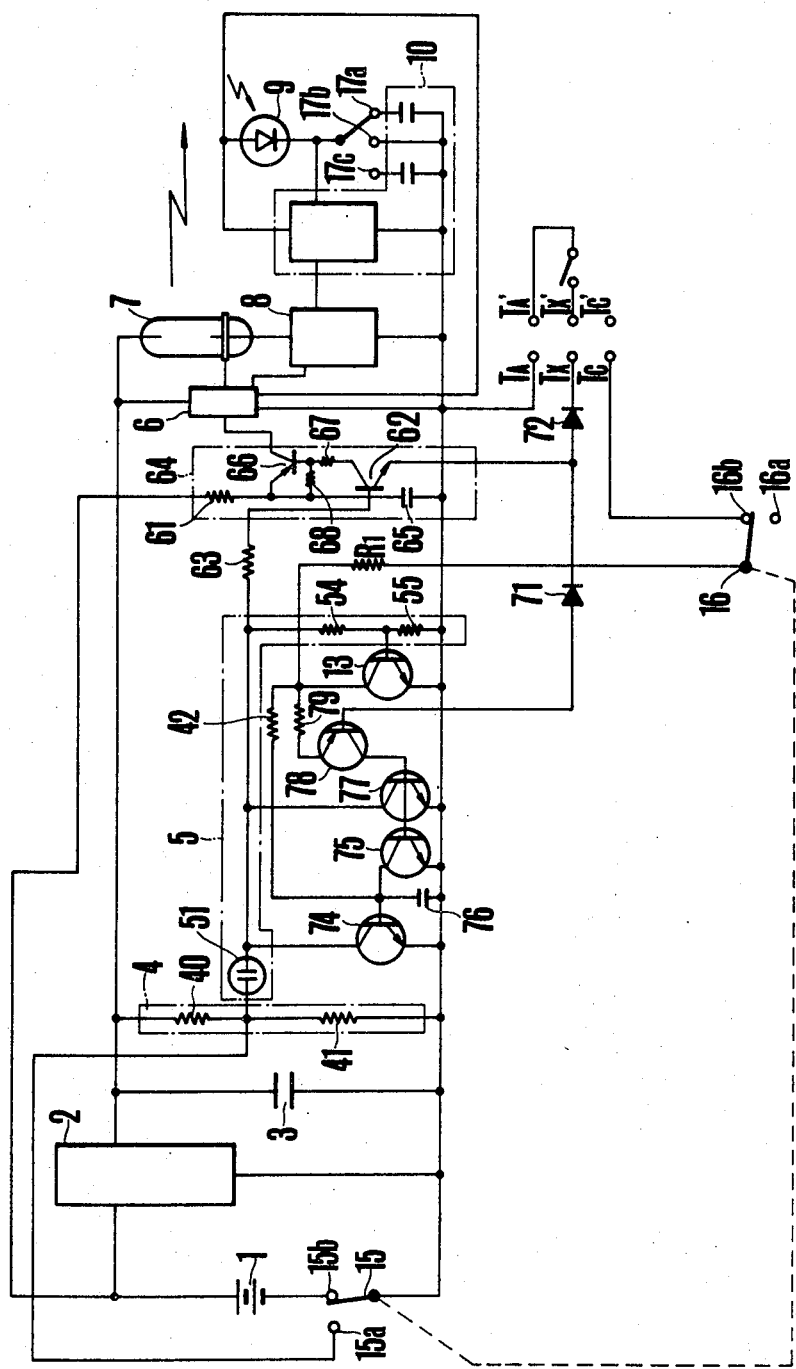
FIG. 3 is a circuit diagram of a flash device to be mounted on the camera shown in FIGS. 1 and 2.

In FIG. 3 which shows the circuit of a flash device mountable on the camera shown in FIGS. 1 and 2, a reference numeral 1 indicates a power source; 2 indicates a booster circuit which boosts the voltage of the power source 1; 3 indicates a main capacitor provided for accumulation of a flash energy; 4 indicates a voltage detecting circuit which is composed of voltage dividing resistors 40 and 41 and which is arranged to detect voltage between terminals of the main capacitor 3; 5 indicates a display circuit which detects charging of the main capacitor up to a predetermined voltage level to make charge completion display, the display circuit being of a known arrangement consisting of a neon tube, etc. and thus the details of the circuit being omitted herein; and 6 indicates a trigger circuit. There is provided a trigger circuit operation control circuit 61, which is arranged as follows: The base of a transistor 62 is connected to the display circuit 5 through a resistor 63. The emitter of the transistor 62 is connected to a terminal TX through a diode 72. The collector of the transistor 62 is connected to the base of a transistor 66 through a resistor 67 while the collector of the transistor 66 is connected to the trigger circuit. The emitter of the transistor 66 is connected to a connection point between a resistor connected in series with the power source 1 and a capacitor 65. This connection point is formed by connecting it to the base of the transistor 66. The trigger circuit 6 is arranged to be actuated only when the display circuit 5 is in an operative state; transistors 74 and 77 which will be described later are in their off conditions; and the synchronizing contact shown in FIG. 1 is turned on. A numeral 7 indicates a flash discharge tube which is caused to generate a flash light by a trigger signal from the trigger circuit; 8 indicates a known discharge control circuit which is connected in series with the flash discharge tube 7, the discharge control circuit 8 being composed of a thyrister connected in series with the discharge tube 7 and a commutation capacitor, etc.; 9 indicates a light receiving element such as a photo cell or the like, which is arranged to receive a reflection light of the flash light discharged by the flash discharge tube; and 10 indicates an integration circuit which integrates the output of the light receiving element 9 and forms in combination with the light receiving element 9 a known light adjusting circuit and an aperture information input circuit which supplies aperture information for flash light photography to the light adjusting circuit. The aperture information which corresponds to each of various aperture values is supplied with the integration element of the light adjusting circuit arranged to be variable. A numeral 13 indicates a transistor the base of which is connected to the above stated display circuit 5. The transistor 13 is arranged to be turned on by lighting of the neon tube of the display circuit. A resistor R1 is provided for transmission of a flash photography shifting signal to a control circuit of the camera to automatically control the shutter time to values suitable for flash photography.

A power source switch 15 for the flash device is selectively connected to terminals 15a and 15b. A selection switch 16 is interlocked with the switch 15 and its connection is shifted between terminals 16a and 16b in response with the switch 15. Another selection switch 17 is provided for selection of the operation of the light adjusting circuit and an aperture value for such light adjustment. The switch 17 is arranged to be selectively connected to terminals 17a, 17b and 17c. A reference symbol TA indicates a grounding terminal; TX indicates a synchronizing contact connecting terminal; and TC indicates a terminal for a flash control signal. Numerals 40 and 41 indicate resistors which are provided for control of lighting of the neon tube 5 by dividing the charge voltage of the main capacitor 3; 42 indicates a resistor which is connected to the collector of the transistor 13 and also to the base of a transistor 74 which is provided for preventing an erroneous action. The collector of a transistor 73 is connected to the low voltage side of a neon tube 51. The base of a transistor 78 is connected to the terminal TX through diodes 71 and 72 while its emitter is connected to the collector of the transistor 13 through a high resistance 79. The collector of the transistor 78 is connected to the bases of transistors 75 and 77. The collector of the transistor 75 is connected to the base of the transistor 74 and the collector of the transistor 77 to the collector of the transistor 74 respectively.

The structural arrangement described in the foregoing operates as follows: When a desired aperture value is adjusted to the index 201 by turning the aperture ring 200, the spring 202a causes the aperture preset ring 202 to follow the rotation of the aperture ring 200. This rotation is transmitted to the sector gear 223 to determine a resistance value of the variable resistance ΔAV according to the aperture value. At the variable resistance ΔAV, the resistance value is determined by the transmission lever 224 as it rotates in response to the full opening correction pin 225 which corrects the full opening of the lens mounted on the camera. When the dial 112 is adjusted to the index 113a according to the sensitivity value of the film loaded in the camera, a resistance value corresponding to the film sensitivity is set at the variable resistance SV. When the letter marking AUT on the dial 107 is adjusted to the index thereon, the contacts S1, S2 and S3 are turned off according to the conductor pattern set as shown in FIG. 1. Concurrently with this, the contact piece 110 of the switch SW3 is shifted to the contact ON. This causes the $V_{BAT}$ signal to be applied to each part shown in FIG. 1. Then, when the release button 106 is depressed, the first stroke of the depression causes the switch SW1 to close and the transistor Tr1 is turned on accordingly. As a result of this, the voltage E1 develops at both ends of the capacitor C1. The voltage E1 is applied to each part and each of the circuits including gates, amplifiers flip-flops shown in FIG. 1. Then, the operational amplifier OP2 produces brightness information corresponding to the output of the light receiving element which received the transmission light of the photograph taking lens, i.e. there is produced a voltage corresponding to the value Br of APEX indication. The amplifier OP1 receives the constant voltage VC from the constant voltage circuit VC' and a voltage KVC which is higher than the constant voltage VC and supplies a current of $(KVC-VC)/R_{BV}$ to the feedback diode D1 of the amplifier OP1 to determine thereby the potential of the non-inversion input of the amplifier OP2. By determining the value of the resistance $R_{BV}$, the output of the amplifier OP2 can be set in the form of $$VC + (B_{vo} - K1) \cdot V_{step} \qquad (1)$$

wherein $B_{vo}$ is $B_{vo} = B_v - A_{vo} - A_{vc}$; $B_v$, $A_{vo}$ and $A_{vc}$ respectively represent brightness information, information on the full-open F number of the lens and information on lens curvature compensation, etc. in APEX values; K1 represents a constant; and $V_{step}$ represents difference in the output according to the varying steps of the brightness of an object to be photographed. The inversion input terminal of the amplifier OP3 receives a signal of $VC+(B_{vo}-K1)\cdot V_{step}$ of formula (1) and computes it with the constant voltage VC to obtain as its output:

$$VC - (B_{vo} - K1) \cdot (VC/14) \qquad (2)$$

In formula (2), the number of steps is assumed to be 14. The amplifier OP4 is an operational amplifier which receives the constant voltage VC and produces a voltage KVC which is higher than the voltage VC. The output of the operational amplifier OP4 is supplied to the amplifier OP1 and to the amplifier OP5 which computes AVC and ΔAV. The ΔAV means an APEX value indicating deviation of an aperture value of a lens stopped down from the full-open position thereof. The non-inversion input terminal of the amplifier OP5 receives the constant voltage VC; and the amplifier OP5 performs computation between the AVC and ΔAV information setting values to produce the following information as its output:

$$VC+(AV-AVC+K2)\cdot(V/14) \qquad (3)$$

The above stated formula (2) output of the photometric circuit, the formula (3) output of the information setting circuit and film sensitivity information SV are impressed on the inversion input terminal of the amplifier OP6 which computes them with the constant voltage VC supplied to its non-inversion terminal to produce the APEX value of time information as its output as shown below:

$$\{(Bvo+K1)(VC/14)-(\Delta AV-AVC+K2)(VC/14)+\\(SV+K3)(VC/14)\}\times 2+VC=(BV-AVO-\\\Delta AV+SV+K)(VC/7)+VC=(B-\\V-AV+SV+K)(VC/7)+VC=(TV+K)(VC/7)\\+VC \qquad (4)$$

wherein K represents a constant and $K=K1=K2+K3$; $AV=AVO+\Delta AV$; and $TV=BV-AV+SV$. The switch SW6 is turned off for stopping down light measurement. The switch SW10 is provided for correction in the case of a backlighted object, etc. and, with this switch turned on, the output of the amplifier OP6 can be corrected as much as α in such a way as $(TV+K-\alpha)(VC/7)+VC$.

In the stopping-down light measuring mode with the switch SW6 turned off, since the output of the amplifier OP3 is $VC-(BV-AV+K1)(VC/14)$, the value of the element of the amplifier OP5 is selected in such a manner as to make its output $VC+K2\cdot VC/14$. Then, the output of the amplifier OP 6 becomes $$VC+(BV-AV+K1-K2+SV+K3)\\(VC/7)=VC+(TV+K)\,(VC/7)$$

and a computation output similar to formula (4) can be obtained.

Through the above mentioned processes, the analog time information TV under daylight condition is produced from the amplifier OP6 to be displayed on the meter MET inside the view finder through the analog switch AS1 and, at the same time, is supplied to the analog-to-digital conversion circuit D of the next stage.

Figure 4:
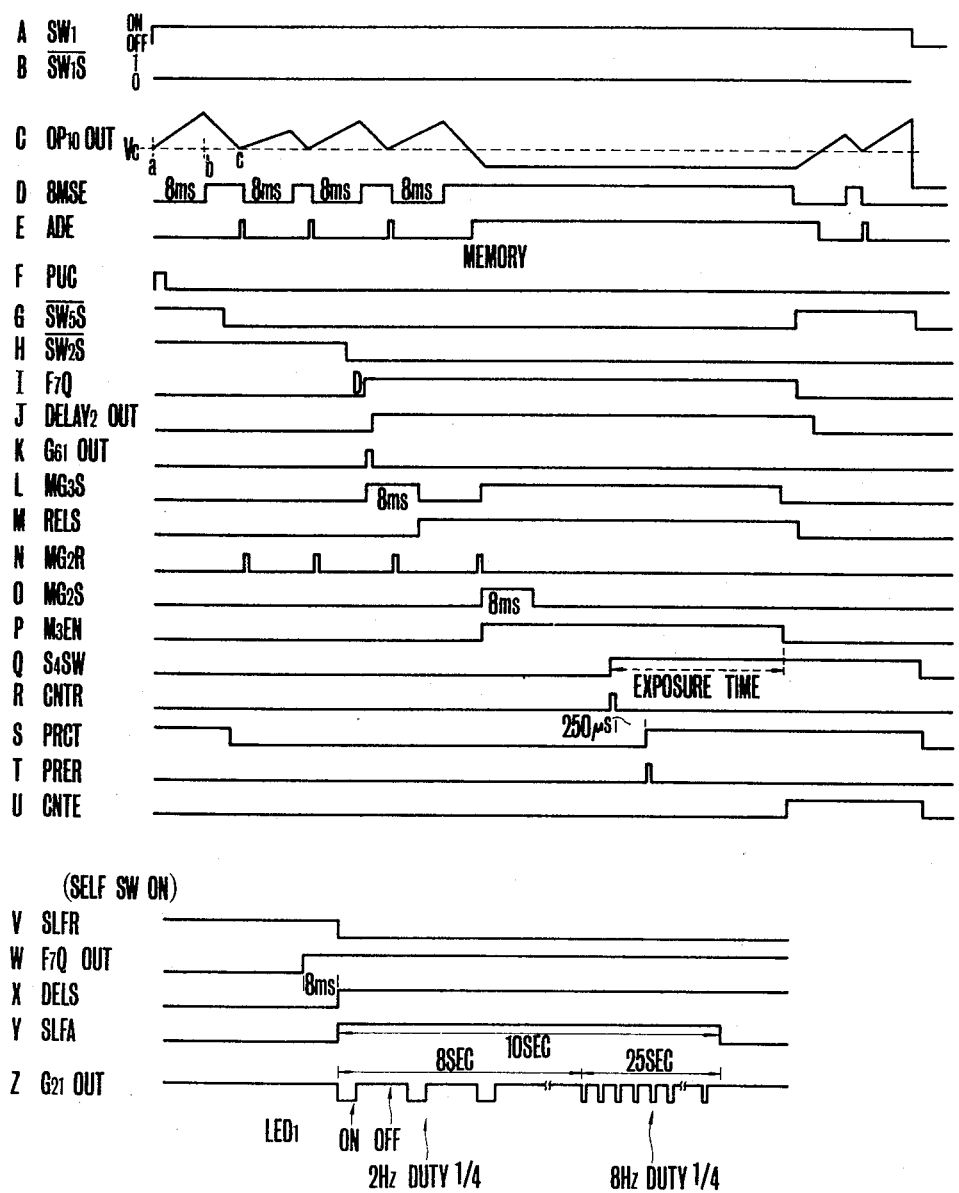
FIG. 4 is a timing chart covering each element included in the circuitry shown in FIG. 1.

Referring now to FIG. 4 which shows a timing chart, the operation after the analog-to-digital conversion circuit without use of a self-timer will now be described.

When the switch SW1 is turned on, the eighth bit of the storage counter CT1 is at "0" level and the 8MSE signal is "0". Since the self-timer switch SW7 is off, the output SLFM of the gate G7 becomes "0" and the output of the gate G6 to which these signals are applied also becomes "0". This "0" signal then makes the buffer amplifier OP8 operative and another buffer amplifier OP9 inoperative. Under this condition, the output of the amplifier OP9 comes to have an infinite impedance and, when the amplifier OP8 is arranged to produce a signal of $(TV-10)\,VC/14+VC$, the output of the amplifier OP10 comes to linearly increase as shown in FIG. 4 because the amplifier OP10 constitutes a mirror integration circuit which has a capacitor C2 in its feedback line (Time a to time b). This signal is supplied to the comparator CP1 and is compared with the constant voltage VC which is suplied to it as its non-inversion input. Since the output voltage of the amplifier OP10 is higher than the constant voltage VC, the output ADE of the comparator CP1 becomes "0". Since the SLFM signal is "0" when the self-timer is not used as mentioned in the foregoing, the gate G1 allows the 16384 Hz pulse from the counter frequency divider CT2 to pass and supplies it to the gate G3. At this time, the gate G2 is in an inhibited state because the SLFM signal is "0". Therefore, the pulse of 16384 Hz is supplied to the clock input terminal CP of the counter CT1. Then, if the shutter information manual setting dial 107 is in the AUT position, all of the inputs to the gate G16 is "1". Therefore, the output $\overline{AUTO}$ of the gate G16 becomes "0". The output $\overline{AUTO}$ is supplied to the preset-enable terminal PE of the counter CT1 to inhibit presetting of the counter CT1. The counter thus comes to admit a clock input only. In other words, the counter CT1 counts in synchronism with the fall of the clock input and the time required before the output 8MSE of the eighth bit of the counter CT1 becomes "1" is about 8 ms. Referring to Part C of FIG. 4, the capacitor C2 of the integration circuit which is charged from time a to time b is caused to begin to discharge (point b of FIG. 4,C) by the voltage KVC of the non-inversion input level of the amplifier OP9 with the input to the integrating amplifier OP10 shifted from the output of the amplifier OP8 to that of the amplifier OP9, because the output of the gate G6 becomes "1" when (b) the 8MSE signal becomes "1".

This causes the output level of the amplifier OP10 to drop as shown in FIG. 4, C. When this output level becomes lower than the constant voltage VC (point c), the output signal ADE of the comparator CP1 becomes "1". This signal is supplied to the gate G4. Since inputs to the gate G4 then are such that the SLFM signal is "0" and the $\overline{MEOK}$ signal is "1" because of a reason as mentioned hereinafter, a signal ADR of "1" is produced as output of the gate G4. Since the SLFR signal is "0", the ADR signal passes through the gate G5 and is supplied to the reset terminal R of the counter CT1. The count is reset the instant (FIG. 4, E) the ADR signal becomes "1". Accordingly, the output 8MSE of the eighth bit then becomes "0" and the integration capacitor C2 is again charged as shown in FIG. 4, C. This cycle is repeated. Under this condition, the counter CT1 does not store information but continues to count the digital information input repeatedly. During this, the wave form due to charging and discharging of the capacitor C2 varies according as the information on brightness varies as shown in FIG. 4.

The circuit operates as follows when photographing begins with the switch SW2 turned on by the second stroke of the shutter release button: The switch SW5 is turned on upon completion of a film winding action and the signal $\overline{SW5S}$ becomes "0". Under this condition, when the second stroke of the shutter button causes the release switch SW2 to turn on, the signal $\overline{SW2S}$ becomes "0". While the switch SW2 is off, the flip-flop F7 is reset by a power up clear signal PUC to the gate G72 and the output Q of the flip-flop F7 is "0". When the switch SW5 is turned on, "1" is supplied to the input terminal D of the flip-flop F7; the input PUC to the gate G70 becomes "0" and the signal SW2S also becomes "0"; and the clock input CP to the flip-flop F7 is delayed a predetermined period of time by the delay circuit DL1 and is supplied as "1" to the flip-flop F7. Since the shutter time selection dial 107 is not set for bulb exposure, the BULB signal which is one of the inputs to the gate G71 is "0". Further, the output of the comparator CP3 is also "0" when the power source voltage E1 exceeds a preset inhibiting voltage value, the output of the gate G72 becomes "0". Accordingly, the output Q of the D type flip-flop F7 becomes "1" in synchronism with the rise of the input CP. (See FIG. 4, G, H and I). When the film winding action is not completed, the switch SW5 is off and the signal $\overline{SW5S}$ is "1". Therefore, even when the release switch SW2 is turned on, the input D to the flip-flop F7 is "0" and the output Q of the flip-flop does not become "1"; and the output Q of the flip-flop F7 still does not become "1" even when the film winding action is completed while the release switch SW2 remains on, because the input CP remains "1" when the input D of the flip-flop F7 becomes "1". Therefore, where an automatic film winding up device is employed, the automatic film winding up device does not cause a continuous release operation as long as the release switches SW1 and SW2 remain on. Next release is not effected upon completion of a winding action and this condition continues. To perform a next photographing operation, the switch SW2 must be turned off and then again turned on.

The switch SW17 is a remote control release switch which is provided for the purpose of effecting a release action of the camera from a point remotely away from the camera. When the power source switch is in an on position, turning on of the switch 17 causes the transistor TR1 to be turned on in the same manner as that the release switch SW1 is turned on through the diode D4. The power source holding circuit is turned on by this. At this moment, if the film winding action has been completed, the input D to the flip-flop F7 becomes "1" concurrently with the turning on of the power source. The output of the gate G70 comes to rise after the time delay of the power up clear signal PUC and then the output of the gate G70 is supplied to the terminal CP of the flip-flop F7 which has been again delayed by the delay circuit DL1. When reset of the initial PUC is stabilized, a trigger signal is applied to the terminal CP of the flip-flop F7 and the output Q of the flip-flop F7 becomes "1". Once this condition has obtained, even if the switch SW17 is turned off, the transistor Tr3 remains on to latch the power source because the output Q of the flip-flop is "Q". In cases where the power source voltage drops to a value below a preset value, the output of the comparator CP3 of the inhibit circuit becomes "1" to make the output Q of the flip-flop F7 "0" before a signal RELS, which causes storing of the computed value TV to begin as will be described hereinafter, comes to rise up to 1 (gates circuits G73 and G720). The output Q of the flip-flop F7 becomes one of the inputs to the gate G61. Further, on the other input terminal of the gate G61 is impressed the output Q of the flip-flop F7 through the delay circuit DL2. Therefore, as shown in FIG. 4, I and J, the output terminal of the gate G61 produces an instantaneous signal RELF in synchronism with the rise of the flip-flop F7. The RELR signal serves to reset the frequency dividing counter CT2 through the gate G44. Further, the output Q of the flip-flop F7 is supplied also to the reset terminal R of the D type flip-flop F5 through an inverter. By this, the flip-flop F5 is always reset when the output Q of the flip-flop F7 is "0". When the output Q of the flip-flop F7 becomes "1", the output of the gate G63 of the control circuit K of the shutter time controlling magnet becomes "1". This is supplied to the transistor Tr4 to turn it on through the gate G64 thus to supply a power to the magnet Mg3. The signal M3EN which is one of the inputs to the gate G64 is arranged to be always "0" as will be described hereinafter. When the power is supplied to the magnet Mg3, the MG3S signal becomes "1" and the output of the gate G62 becomes "1". By this, "1" is supplied to the terminal D of the flip-flop F5. The inputs to the gate G60 which is connected to the input terminal CP of the flip-flop F5 include the output of the delay circuit DL2 and the 64 Hz output of the counter CT2, so that the gate G60 produces the 64 Hz output of the counter CT2 after the counter CT2 has completely been reset. Accordingly, the output Q of the flip-flop F5 becomes "1" after the rise of the 64 Hz, i.e. about 8 ms after resetting of the flip-flop F5. This makes Q into "0" at this point of time so that the power is supplied to the magnet just for 8 ms. At this moment, if the power source voltage drops below an inhibit voltage, the output Q of the flip-flop F7 becomes "0" to terminate all of the sequence actions there. Further, when the coil of the magnet is broken by some cause, the output Q of the flip-flop never becomes "1" because the magnet remains "0". The output Q of the flip-flop F5 becomes a release signal RELS to begin the next sequence of actions. The gate G73 is arranged in such a way that, even when the power source deteriorates to a great degree as in the case of long exposure, the system can be still operated despite of such.

The following description covers the storing of digitized exposure information and the operation of the electromagnetic release magnet: The SR type flip-flop F2 is reset by a power up clear signal PUC when the power source is turned on. On the other hand, the counter CT2 is reset by the PUC signal input to the gate G44. Since no self-timer is used, the SLFM signal which is one of inputs to the gate G14 is "0". The gate G14 is set by the rise of the 8 Hz signal from the counter CT2 and the output Q thereof becomes "1". In other words, the output Q of the flip-flop F2 becomes "1" about 60 ms after the power source is turned on. This means that, even when the switches SW1 and SW2 are instantaneously turned on by quick depression of the shutter button, the memorizing action can be performed after a minimum period of time of 60 ms. This arrangement ensures that the memorizing action can be performed without fail even in cases where the brightness of an object to be photographed is low and a longer period of time is required before the output of the operational amplifier OP2 becomes stable. When the release signal RELS becomes "1" 60 ms after the power sorce is turned on as mentioned above, the output MEOK of the gate G13 becomes "1" and is supplied to the gate G4 to put the gate G4 into an inhibited state. The output signal ADR of the gate G4, therefore, does not become "1" even at the time of completion of the A-D conversion through which the output signal ADE of the A-D converting comparator CP1 becomes "1". Accordingly, the reset of the counter CT1 which gives an output of the gate G5 is not performed. Further, since the signal ADE under this condition is "1", the output of the gate G1 becomes "0" and the A-D conversion information is stored by the counter CT1. This condition is shown by FIG. 4, D, E and M as timing charts for these parts. On the other hand, since both the inputs SMSE and ADE to the gate G12 become "1", the gate G45 produces a short pulse MG2R, which serves to reset the counter CT2 through the gate G44 (FIG. 4, N). The D type flip-flop F3 which receives an inverter output of the MEOK signal as its D input has the MEOK signal of "1" and in synchronism with the rise of the output of the gate G12, the output Q of the flip-flop F3 becomes "1". The output of the gate G10 to which this output Q of the flip-flop F3 is supplied is inhibited while the counter CT2 is reset by the output of Delay 3. Then, the gate G10 produces an output "0" until the 64 Hz signal is produced from the counter CT2. The output of the gate G10 becomes "1" after the rise of the 64 Hz signal from the counter CT2, i.e. after about 8 ms, and comes to reset the flip-flop F3 through the gate G11. In other words, the output Q of the flip-flop F3 is "1" just for a period of 8 ms (FIG. 4, O). The Q output MS2S of the flip-flop F3 actuates the magnet Mg2 through an inverter and a buffer. This causes a current that resists a magnetic force of the permanent magnet 245 to flow through the coil to offset the attraction force of the permanent magnet 245. The spring 246a causes the armature holding lever 246 to rotate counterclockwise together with the signal start lever 249 and thus to cause the release lever 211 to rotate. The operation of the release lever 221 causes the locking claw 210 to turn counterclockwise to unlock the automatic stop force accumulator lever 206, which is then caused by the spring 206a to rotate clockwise. With the lever 206 rotated, the automatic stop lever 205 rotates clockwise together with the lever 206 through the common lever 209. This causes the pin 203 of the aperture driving ring on the lens side to rotate to stop down aperture blades which are not shown in the drawing. Further, since the tip portion 207b of the automatic stop force accumulator lever 206 is moved by the mirror driving lever 234 in the direction of moving away, the spring 234a causes the mirror driving lever to rotate counterclockwise. The mirror spring up lever 235 which is disposed coaxially with the mirror driving lever 234 rotates in the same direction together with the part 236a of the spring up locking claw 236. This causes the spring up intermediate lever 237 to rotate counterclockwise. The lever 237 then causes the mirror receiving plate 238 to spring up on its shaft 238b through the pin 238a of the mirror receiving plate 238. Further, with the mirror driving lever 234 rotated, its protrusion 234d causes the end portion 239a of the front diaphragm locking lever 239 to rotate clockwise while a hooked portion thereof comes off the rising portion of the front diaphragm release lever 240. Then, the spring 240a causes the release lever 240 to rotate the front diaphragm clamping lever 241. The rotation of the lever 241 then turns off the count switch SW4 and, at the same time, allows the front diaphragm of a shutter mechanism which is not shown to start.

The Q output MG2S of the flip-flop F3 is supplied to the set input terminal S of the RS type flip-flop F4 to set the flip-flop F4 which has been reset by the PUC input of the gate G46 when the power source is turned on. The "1" signal of the Q output M3EN of the flip-flop F4 causes the M3EN signal of "0" to be supplied to the gate G65 of the flash control circuit P to inhibit the flash device charging completion signal CCEF. The "1" signal M3EN also comes through the gate G64 to cause resumption of power supply to the shutter time controlling magnet Mg3 (FIG. 4, L and P). The output of the gate G47 is supplied to the reset terminal of the flip-flop F4 through the gate G46. When the exposure time completion signal CNTE which is one of the inputs to the gate G47, has become "1", the flip-flop F4 is reset and the shutter time controlling magnet Mg3 is turned off. This causes the rear diaphragm gear 253 to rotate. The pin 253b then causes the lever 242 to rotate clockwise. The rotation of the lever 242 in turn causes the signal lever 243 to rotate counterclockwise. The mirror return signal lever 244 rotate clockwise. The pin 244a rotates the mirror spring up locking claw 236 counterclockwise to unlock the mirror spring up lever 235. The mirror receiving plate 238 is released from the spring up condition. The mirror is brought down back into its lowered position by a spring which is not shown. The lower end portion of the mirror return signal lever 244 rotates the automatic stop return signal lever 211 counterclockwise to cause the pin 209a of the common lever to rotate counterclockwise and thus to unlock the downward bent 205b of the automatic stop lever 205. The returning spring 205a then rotates the automatic stop lever 205 counterclockwise. A spring which is not shown in the drawing then causes the pin 203 of the diaphragm driving ring on the lens side to follow the rotation of the automatic stop lever 205 to open the diaphragm aperture blades and the photographing operation is completed.

When the dial 107 is set in the position of the bulb mode, the output BULB of the gate G17 is "1". Therefore, the CNTE input of the gate G47 is inhibited. When the switch SW2 which is operated by the second stroke of the shutter release button is turned off with the button released from the state of being depressed, the output of the gate G71 becomes "1". Then, when the power source latch is removed and the switch SW1 is turned off to turn off the power source, the travel of the shutter rear diaphragm is effected to complete a bulb photographing operation.

In storing the above mentioned information, the output 8MSE of the eighth bit of the counter CT1 is always "1". Therefore, the output terminal of the amplifier OP10 of the integration circuit for storage is connected to the side of the amplifier OP9 and the capacitor C2 is charged in the direction reverse to the direction mentioned in the foregoing. However, when the voltage of the capacitor C2 becomes a preset value, the charging current flows to the diode D5 and the capacitor C2 is prevented from being charged further through the action of the diode D5.

The digital information (time) stored in the storing counter CT1 is read out by the real-time-expansion and time-correction circuits in the next stage to determine a shutter time. As shown in Table 1 below, the digital inforation of the counter CT1 includes shutter time values from 1/1000 sec. to 4 sec. arranged in a series of multiples:

TABLE 1

| B8 | B4 | B2 | B1 | Shutter time (sec.) |
|----|----|----|----|--------------------|
| 0  | 0  | 0  | 0  | 1/1000 |
| 0  | 0  | 0  | 1  | 1/500  |
| 0  | 0  | 1  | 0  | 1/250  |
| 0  | 0  | 1  | 1  | 1/125  |
| 0  | 1  | 0  | 0  | 1/60   |
| 0  | 1  | 0  | 1  | 1/30   |
| 0  | 1  | 1  | 0  | 1/15   |
| 0  | 1  | 1  | 1  | $\frac{1}{8}$ |
| 1  | 0  | 0  | 0  | $\frac{1}{4}$ |

TABLE 1-continued

| B8 | B4 | B2 | B1 | Shutter time (sec.) |
|---|---|---|---|---|
| 1 | 0 | 0 | 1 | ½ |
| 1 | 0 | 1 | 0 | 1 |
| 1 | 0 | 1 | 1 | 2 |
| 1 | 1 | 0 | 0 | 4 |
| 1 | 1 | 0 | 1 | 4 |
| 1 | 1 | 1 | 0 | 4 |
| 1 | 1 | 1 | 1 | 4 |

In the case of Table 1, the shutter time value is arranged not to exceed 4 sec. for the reason mentioned hereinafter. Further, the $B\frac{1}{2}$, $B\frac{1}{4}$ and $B\frac{1}{8}$ of the first, second and third bits of the counter are arranged by dividing information of one step by 8. With the exception of that the mode selection dial 107 is set in the AUT position, the stored memory of A-D conversion information is cleared by a signal from the gate G18 when the magnet Mg2 for electromagnetic release is turned on and the shutter time can be directly preset by the conductor pattern DG1. Further, with the exception of the bulb photographing mode, since the signal CCEF becomes "0" upon completion of charging of the flash device, the gate G18 is put into an inhibited state and 1/60 sec. which is an output of the amplifier OP7 arranged exclusively for flash light shutter time is stored. After the magnet Mg2 for electromagnetic release is released, the mechanical sequence of actions mentioned in the foregoing cause the front diaphragm to start. Then, the count switch SW4 is turned off. Through the delay circuit DL4 and the gate G59, the gate G44 produces a short pulse to reset the counter CT2 (FIG. 4, Q and R). Then, if both of the time correction switches SW15 and SW16 are on, the gates G49 and G50 are opened. The 1024 Hz and 2048 Hz signals from the counter CT2 are supplied to the gate G57 through the gates G55 and G56. Accordingly, the output of the gate G57 is supplied to the terminal CP of the D type flip-flop F6 through the gate G58. This clock pulse input to the flip-flop F6 is set at the rising time point of 1024 Hz X 2024 Hz after the reset of the flip-flop is released. The length of time required for this is about 250 μs (FIG. 4, S). The instant the Q output PRCT of the flip-flop F6 becomes "1", the delay circuit DL5 and the gate G73 cause the gate G73 to produce a reset pulse PRER, by which the counter CT2 is reset through the gate G44 (FIG. 4, T).

TABLE 2

| P1 (SW15) | P2 (SW16) | Correction time |
|---|---|---|
| 0 | 0 | 250 μs |
| 1 | 0 | 500 μs |
| 0 | 1 | 750 μs |
| 1 | 1 | 1 ms |

Table 2 shows the lengths of time required for shutter time correction by combination of opening and closing of the shutter time correction switches SW15 and SW16. As shown in Table 2, the time correction obtainable from the switches SW15 and SW16 is not continuous and requires fine adjustment, which can be performed by means of a mechanical governor. In such a case, the use of a small mechanical member will suffice because the required adjustment is within 250 μs. Continuous correction over a wide range from 250 μs to 1250 μs may be possible by the use of such a mechanical member in combination with an electric correction circuit. When the counter CT2 is reset by the signal PRER from the gate G73, the real shutter time is counted according to the information of the counter CT1. For example, when the information stored in the counter CT1 is 0, 0, 1, 0, 0, 0, 0 in sequence from the first bit through the seventh bit. Then, "0" of the output terminal of the 4-16 line decoder DE1 becomes "1". By this, the gate G35 is opened. The output of 8192 Hz of the counter CT2 which has been supplied to the gate G35 is supplied to the counter CT3 through the gate G36. In the counter CTs, count is performed in synchronism with the fall of the pulse from the gate G36. The output CT8E of the terminal 8 becomes "1" when the count reaches 8. Then, when further 4 are counted, the two inputs to each of the three EX-OR gates G38, G39 and G40 come to coincide with each other. Through this, the output of the gate G41 becomes "1" and the output CNTE of the gate G43 becomes "1". The RS flip-flop F4 is reset. This causes the shutter time controlling magnet Mg3 to turn off to end exposure. In this example, the real shutter time becomes:

$(1/8192) \times 12 = 1/683$ sec.

The real time counting circuit can be expressed by the following formula: Assuming that the integral part of the memory at the counter CT1 is 10-A and the decimal part thereof is B, TV becomes A+B/8 and then the real time becomes $1/8 \times 2A \cdot (8+B)$, wherein A is $-2 \leq A \leq 10$ while B is $0 \leq B \leq 7$.

The counter CT3 is released from reset by the output of the gate G37 when the signal PRCT becomes "1" after exposure time correction counting. Further, when the output of the decoder DE1 comes to exceed 12, the output OV4S of the gate G22 becomes "1" and, after the counter CT3 has counted 16 of the 4 Hz output (after 4 seconds), the signal CNTE becomes "1". Thus, the exposure time never exceeds 4 seconds according to this arrangement as shown in Table 1.

With no self-timer used, the circuitry shown in FIG. 1 operates as described in the foregoing. For photographing with a self-timer, the circuitry of FIG. 1 operates as described below:

With a self-timer used, the switch SW7 is turned on. When the switch SW1 is turned on by the first stroke of the shutter release button operation, the signal SW1S becomes "0". At this moment, the switch SW2 is off and the signal SW2S is "1". With the switch SW7 turned on, the SW7S signal becomes "0" and causes the output SLFR of the gate G68 to become "1". This signal is supplied to one of the input terminals of the gate G5 of the A-D conversion circuit to completely reset the counter CT1 by the output of the gate G5. In other words, the analog-to-digital conversion is inhibited under this condition. Concurrently with this, the outputs of the gates G7 and G6 become "1". The input terminal of the amplifier OP10 of the mirror integration circuit is connected to the amplifier OP9 and, as mentioned in the foregoing, the output of the amplifier OP10 is held at a preset voltage lower than the constant voltage VC by the action of the diode D5. Following this, when the switch SW2 is turned on by the second stroke of the shutter release button operation, both of the signals SW1S and SW2S becomes "0" and, as described in the foregoing, an electric current is allowed to flow to the shutter time controlling magnet Mg3 for 8 ms. The Q output RELS of the flip-flop F5 becomes "1" after completion of checking for inhibited voltage, etc. A rise signal of this output REL causes the Q output SLFA of the D type flip-flop F1 to become "1". (FIG. 4, V, W, X, Y). Concurrently with this, the gate G68 is inhibited by this REL signal of "1" and the output SLFR of the gate G68 becomes "0". At this moment, the output of the gate G6 still remains "1" and by this, the counter CT1 is released from its reset state and, with the signal SLFM becoming "1", this signal causes a signal of 4 Hz to be supplied to the counter CT1 through the gates G3 and G2. On the other hand, at the counter CT2, only the bit of 64 Hz has become "1" the instant the Q output REL of the flip-flop F5 has become "1". Accordingly, the count begins from this state one after another. When the bits of B1 and B4 of the counter CT1 have come to rise, i.e. during a period of about 10 seconds, the outputs of the gates G9 and G8 become "1" to reset the flip-flop F1 and the Q output SLFA thereof becomes "0". This period of time, i.e. a period during which the signal SLFA remains "1", is self-timer time. During this self-timer time, the gates G19 and G20 are opened by the signal SFLA; and, by the bit B4 of the counter CT1, a signal of each frequency is arranged to pass through the gate G20 for the first 8 seconds and the gate G19 for the next 2 seconds. In this instance, the duty of 2 Hz of the gate G20 is ¼ and that of 8 Hz of the gate G19 is ¼. Therefore, the diode LED1 for self-timer display if driven by the output of these gates through the gate G21 and a buffer amplifier. Upon expiration of the self-timer time, the signal SLFA becomes "0" to permit the same sequence of actions as in the case of the operation without the self-timer. Further, in th counter CT2, when the Q output SLFA of the flip-flop F1 becomes "0", i.e. when the self-timer time has expired, the outputs of all bits are "0". The flip-flop F2, therefore, is not set until the output of next 8 Hz becomes "1" (about 60 ms). Accordingly, about 60 ms after expiration of the self-timer time, the D input MEOK to the flip-flop F3 becomes "1" to permit the storing and exposure control sequence of actions.

Next, the out-of photometric range display circuit M operates as follows: When a film of high sensitivity is used for the camera, for performing stopping-down light measurement photographing, etc., the light actually received by a photogalvanic element (such as SPC) is some times very weak even when the correct exposure time is within a normal range. In the case of such a weak light, the light receiving element in general comes to have a poor photometric accuracy and thus makes it difficult to carry out a photographing operation at a correct exposure value.

In such a case, a warning is displayed by the display element LED2 which is provided in the display circuit M shown in FIG. 1. A photoelectric signal BVO coming from the photometric circuit A and the computation circuit B is impressed on the inversion input terminal of the comparator CP2 of the display circuit M and is compared with a reference voltage VC supplied to the non-inversion input terminal thereof. When the light incident upon the light receiving element P1 is weak, the non-inversion input to the comparator CP2 becomes higher than the inversion input to cause the output of the comparator CP2 to be "1". The gate G66 receives the signals of 4 Hz and 8 Hz from the counter CT2 to produce at its output terminal a signal of duty ¼ at 4 Hz. When the output of the comparator CP2 is "1", this output of the gate G66 is allowed to flow to the display element LED2 to make a flickering display there. Furhter, the Q output of the flip-flop F7 is supplied to the gate G67 and, when the switch SW2 is turned on by the second stroke of the shutter release button to cause the camera to take a shutter release action, the warning display by the display element LED2 is arranged to disappear.

In the flash photographing mode, the flash device charging completion signal circuit operates in the following manner: To carry out flash photographing, the automatic light adjusting flash device shown in FIG. 3 is mounted on a hot shoe of the camera. The automatic light adjusting flash device automatically adjusts the quantity of emission light by receiving a reflection light from an object to be photographed. The circuitry on the camera side is automatically shifted into the flash photographing mode by a signal produced upon completion of charging of the main capacitor of the flash device. If the main capacitor of the flash device has not been charged completely when the release switch SW1 is turned on, no control signal from the control terminal TC' is supplied to the base of the transistor Tr2 and the transistor remains off. The collector output CCEF of the transistor, therefore, is "0". Since the M3EN signal is "0", the NAND gate G65 allows the 128 Hz pulse from the counter frequency divider CT2 to pass through there and the pulse of 128 Hz is thus supplied to the base of the transistor Tr2. When the terminal voltage of the main capacitor of the flash device (FIG. 3) reaches a given level, the transistor 13 shown in FIG. 3 is turned on in synchronism with a rise of the 128 Hz pulse supplied to the control terminal TC'. Then, a control signal from the flash device is impressed on the base of the transistor Tr2 shown in FIG. 1 through the terminal TC' of the hot shoe. This turns the transistor Tr2 on and the output signal CCEF of the transistor becomes "1". The output of the gate G65 is kept at "1" by this signal CCEF, which is latched to "1" to bring the camera into a charging completion mode. When the electromagnetic releasing magnet Mg2 is excited to bring the shutter into an operative state, the signal M3EN becomes "1 ". This keeps the output of the gate G65 at "1". After this, when the main capacitor 3 of the flash device is charged, the transistor 74 is turned on. Therefore, the base potential of the transistor 13 no longer increases and the transistor 13 turns off. Therefore, the transistor Tr2 on the camera side does not turn on and, accordingly, the output CCEF remains at "0". Thus there obtains no charging completion mode. Under this condition, the camera operates in an AE mode for daylight photography. When the X contact is turned off after the rear diaphragm of the shutter has traveled, therefore, the transistor 75 of the flash device circuit is turned off. Although, in response to this, the transistor 74 tries to turn on, time delay caused by the capacitor 76 prevents the transistor from turning on immediately and thus the transistor 13 is turned on prior to the transistor 74. This causes the base of the transistor 74 to become "0" ad the transistor does not turn on. Accordingly, the transistor Tr2 on the camera side is turned on and the camera is brought into the charging completion mode. With the charging completion mode having obtainted in this manner, the output CCEF of the transistor Tr2 becomes "1". The analog switches of the computing circuit B are shifted to turn off AS1 and to turn on AS2. By this shifting action, the flash photographing time information which has been set at the amplifier OP7 is supplied to the analog-to-digital converter of the next stage instead of the time information TV which is the output of the amplifier OP6. At the same time, the flash photographing time information is displayed by the display meter MET. The amplifier OP7 is set to produce a signal of $(6-K)(VC/7)+VC$, i.e. TV=6(1/60 sec.). Concurrently with this, the signal CCEF is connected through a buffer to the light emitting diode LED3 provided for illumination of the flash mode display meter to illuminate the pointer and the indication of 1/60 sec. of the meter.

After photographing, a winding up and charging operation is performed in the following manner: The winding shaft 214 and the charge cam 215 which are interlocked with an unillustrated winding lever are rotated in the direction of an arrow to rotate the charge transmission lever 216 clockwise. The intermediate lever 218 which is connected to the lever 216 is also rotated clockwise. With the intermediate lever 218 rotated, this causes the charge lever 213 through a pin 218a to rotate clockwise. Then, the stepped part 213a charges the automatic stop force accumulator lever 206 by turning it counterclockwise against the spring 206a until it is locked by a locking claw 210. The tip portion of the automatic stop force accumulating lever 206 then forces the mirror driving lever 234 to rotate clockwise. Since the mirror driving lever 234 is locked by the locking claw 210 of the lever 206, the mirror driving lever is locked in a charged state. In response to the rotation of the mirror driving lever 234, the spring up locking claw 236 also rotate together in the same direction until it engages with the mirror spring up lever 235. In relation to a winding up mechanism which is not shown, a set lever which is not shown rotates the front diaphragm release lever against the spring 240a until it comes to engage with the front diaphragm locking lever 239.

The above stated rotation of the intermediate lever 218 also performs a charging function to allow the armature 247 to be attructed by the magnet Mg2 of the camera release unit Sm provided with a permanent magnet. The magnet charge plate 218b of the intermediate lever 218 causes the pin 249b of the start signal lever 249 to rotate clockwise. The armature holdng lever 246 which is unified with the lever 249 charges in the same direction against a spring 246a to allow the armature to be attracted by the magnet Mg2 which is provided with the permanent magnet. Since the attraction of the armature 247 depend on the degree of rotation of the intermediate lever 218, the magnet charge plate 218b is made of an elastic material to absorb unevenness in the rotating degree of the lever 218 leaving an ample allowance for charge there for attraction of the armature by the magnet which is provided with the permanent magnet.

In the camera control system of the present invention, as described in the foregoing, the shutter time is obtained by A-D conversion of analog time to store it in a digital form and then by digitally expanding it to real time. The shutter time obtained in this manner is very accurate. In addition to that, in the case of a self-timer operation, the operation is performed with two counters connected in series while these counters are separated from each other for other operations. The arrangement is very effective. Each of the circuits of the system is supplied with power only for a minimum period of time required for its action, so that consumption of the battery employed can be held to a minimum degree. Further, there is provided a check device which is used for every photographing operation to ensure the action of each part in a normal conditon. Each part is automatically shifted to the flash photographing mode when the flash device used in combination with the camera has been completely charged. These conditions are clearly displayed inside the view finder. In accordance with the present invention, therefore, a camera can be arranged to very accurately perform automatic exposure control in every photographing mode.

What is claimed is:

1. An automatic exposure control device for a camera capable of permitting flash photography, said device comprising:

exposure computing means for natural light photographing, said computing means arranged to generate an exposure signal corresponding to the brightness of an object to be photographed;

exposure computing means for flash photographing, said computing means being arranged to generate an exposure signal suitable for a flash photographing operation;

exposure control means for performing exposure control in response to one of the exposure signals generated by said natural light photographing exposure computing means and said flash photographing exposure computing means;

change-over means for applying one of the exposure signals of the natural light photographing exposure computing means and the flash photographing exposure computing means to said exposure control means;

electromagnetic release means for actuating the internal mechanism of the camera, said release means being arranged to produce an electrical signal when it operates;

signal generating means which generates a selection signal until said electrical signal is applied thereto from said electromagnetic release means and generates an inhibition signal after application of said electrical signal;

a discharge tube arranged to emit a flash therefrom;

accumulating means for accumulating light emitting energy for said discharge tube;

detecting means for detecting the amount of said light emitting energy accumulated at said accumulating means, said detecting means being arranged to produce a detection signal when the accumulated amount of said energy reaches a predetermined value;

triggering means for enabling said discharge tube to emit a flash in response to the detection signal produced by said detecting means;

control means for bringing about a permissive state to enable said detecting means to produce a detection signal or an inhibitive state to inhibit said detecting means from producing the detection signal, said control means being arranged to bring about the permissive state when a selection signal is applied thereto from said signal generating means and bring about the inhibitive state when an inhibition signal is applied thereto; and change-over control means for shifting said change-over means to have the exposure signal of said flash photographing exposure computing means applied to said exposure control means in response to the generation of the detection signal of said detecting means when the selection signal is generated by said signal generating means and to have the exposure signal of said natural light photographing exposure computing means applied to said exposure control means when the detection signal is not generated while there is generated said selection signal, said change-over control means further being arranged to hold said change-over means in a shifting state in such a way as to have the exposure signal of said natural light photographing exposure computing means applied to said exposure control means when said inhibition signal is generated by said signal generating means.

2. An automatic exposure control device according to claim 1, wherein there are provided a camera body and a flash device which is arranged to be attachable to and detachable from said camera body, said camera body having said natural light photographing exposure computing means, flash photographing exposure computing means, exposure control means, change-over means, electromagnetic release means, signal generating means, and change-over control means, said flash device having said discharge means, accumulating means, detecting means, triggering means and control means.

3. An automatic exposure control device according to claim 2, further including a terminal of said camera body and a corresponding terminal of said flash device, these terminals being arranged to come into contact with each other when said flash device is mounted on said camera body, said camera body and said flash device being arranged to make signal exchange through said terminals.

* * * * *